(12) United States Patent
Lee et al.

(10) Patent No.: US 9,218,308 B2
(45) Date of Patent: Dec. 22, 2015

(54) APPARATUS AND METHOD FOR ARBITRATING BUS

(75) Inventors: Hyuk Jae Lee, Seoul (KR); Kwon Taek Kwon, Seoul (KR); Seok Yoon Jung, Seoul (KR); Kyu Dong Kim, Seoul (KR); Deum Ji Woo, Seoul (KR)

(73) Assignees: Samsung Electronics Co., Ltd., Suwon-si (KR); SNU R&DB FOUNDATION, Seoul (KR)

( * ) Notice: Subject to any disclaimer, the term of this patent is extended or adjusted under 35 U.S.C. 154(b) by 145 days.

(21) Appl. No.: 13/272,589

(22) Filed: Oct. 13, 2011

(65) Prior Publication Data

US 2012/0124262 A1  May 17, 2012

(30) Foreign Application Priority Data

Nov. 12, 2010  (KR) .......................... 10-2010-0112671

(51) Int. Cl.
  *G06F 13/20* (2006.01)
  *G06F 13/362* (2006.01)
(52) U.S. Cl.
  CPC .................................. *G06F 13/3625* (2013.01)
(58) Field of Classification Search
  CPC .................................................. G06F 13/3625
  USPC .......................... 710/113, 240–244, 200, 300
  See application file for complete search history.

(56) References Cited

U.S. PATENT DOCUMENTS

| 5,446,847 | A  | * | 8/1995 | Keeley et al. ................. 710/100 |
| 5,623,672 | A  | * | 4/1997 | Popat ............................ 710/240 |
| 7,577,780 | B2 | * | 8/2009 | Huang et al. .................. 710/116 |
| 2004/0006659 | A1 | | 1/2004 | Lee |
| 2004/0210695 | A1 | | 10/2004 | Weber et al. |
| 2007/0016709 | A1 | * | 1/2007 | Kazama ........................ 710/113 |

FOREIGN PATENT DOCUMENTS

| JP | 2008-532183 | * | 8/2008 |
| KR | 10-0442861 | | 7/2004 |
| KR | 10-2005-0082834 | | 8/2005 |
| KR | 10-0555501 | | 2/2006 |
| KR | 10-2009-0118610 | | 11/2009 |
| WO | 2006/094142 A2 | | 9/2006 |

OTHER PUBLICATIONS

European Search Report dated Mar. 5, 2012 in related European Patent Application 11188771.7.

* cited by examiner

*Primary Examiner* — Tim T Vo
*Assistant Examiner* — Kim T. Huynh
(74) *Attorney, Agent, or Firm* — NSIP Law

(57) ABSTRACT

A bus arbitration apparatus and method are provided. A plurality of masters may be classified into master types based on master characteristics, and bus arbitration may be performed. Thus, it is possible to prevent a bus from being distributed to a predetermined master, and it is possible to improve overall performance of a bus system by solving a problem of unbalanced distribution of performance between the plurality of masters.

16 Claims, 9 Drawing Sheets

APPARATUS AND METHOD FOR ARBITRATING BUS

CROSS-REFERENCE TO RELATED APPLICATIONS

This application claims the benefit of Korean Patent Application No. 10-2010-0112671, filed on Nov. 12, 2010, in the Korean Intellectual Property Office, the disclosure of which is incorporated herein by reference.

BACKGROUND

1. Field

One or more embodiments of the following description relate to a bus arbitration apparatus and method, and more particularly, to a bus arbitration apparatus and method based on characteristics of masters.

2. Description of the Related Art

Recently, as various types of application programs are implemented in a single system, the number of masters forming a system is increasing, and types and characteristics of masters are becoming diverse. Accordingly, a conventional bus arbitration method has been developed by focusing on a best performance shown by each of various masters in a system.

However, to improve overall system performance, performance of each master needs to be efficiently adjusted.

For example, assuming that four processors and a single shared memory are connected to a single bus system, when a request of a single processor transmitted to a bus is processed preferentially, 100% performance of the processor may be achieved, however, the other three processors may not achieve 100% performance, due to the influence of the preferentially processed processor. In this example, overall system performance may be matched to the three processors, instead of the processor achieving 100% performance. Accordingly, such a bus arbitration scheme may cause an efficiency problem.

SUMMARY

The foregoing and/or other aspects are achieved by providing a bus arbitration apparatus for arbitrating a plurality of masters sending an arbitration request, the bus arbitration apparatus including a processor to control one or more processor-executable units, a collection unit to collect the arbitration request and accumulated arbitration information for each of the plurality of masters, a Quality of Service (QoS) analyzing unit to classify the plurality of masters into a plurality of master types based on a master characteristic of each of the plurality of masters, and to compute a delay time for each of the plurality of masters based on the accumulated arbitration information, the arbitration request, and the plurality of master types, and an arbitration unit to generate a bus arbitration signal based on the plurality of master types and the delay time, the bus arbitration signal being used to arbitrate the plurality of masters.

The foregoing and/or other aspects are achieved by providing a bus arbitration method for arbitrating a plurality of masters sending an arbitration request, the bus arbitration method including collecting the arbitration request and accumulated arbitration information for each of the plurality of masters, classifying the plurality of masters into a plurality of master types based on a master characteristic of each of the plurality of masters, computing, by way of a processor, a delay time for each of the plurality of masters based on the accumulated arbitration information, the arbitration request, and the plurality of master types, and generating a bus arbitration signal based on the plurality of master types and the delay time, the bus arbitration signal being used to arbitrate the plurality of masters.

The foregoing and/or other aspects are achieved by providing a bus arbitration apparatus for arbitrating a plurality of masters each sending an arbitration request. The bus arbitration apparatus includes a processor to control one or more processor-executable units, a Quality of Service (QoS) analyzing unit to classify the plurality of masters into a plurality of master types based on a master characteristic of each of the plurality of masters and to compute a delay time for each of the plurality of masters based on arbitration information accumulated for each of the plurality of masters, the arbitration requests, and the plurality of master types, and an arbitration unit to generate a bus arbitration signal to arbitrate the plurality of masters based on the plurality of master types and the delay time.

The foregoing and/or other aspects are achieved by providing a bus arbitration method for arbitrating a plurality of masters each sending an arbitration request. The bus arbitration method includes classifying the plurality of masters into a plurality of master types based on a master characteristic of each of the plurality of masters, computing, by way of a processor, a delay time for each of the plurality of masters based on arbitration information accumulated for each of the plurality of masters, the arbitration requests, and the plurality of master types, and generating a bus arbitration signal to arbitrate the plurality of masters based on the plurality of master types and the delay time.

Additional aspects, features, and/or advantages of example embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the example embodiments, taken in conjunction with the accompanying drawings of which.

DETAILED DESCRIPTION

Reference will now be made in detail to example embodiments, examples of which are illustrated in the accompanying drawings, wherein like reference numerals refer to the like elements throughout. Example embodiments are described below to explain the present disclosure by referring to the figures.

Figure 1:
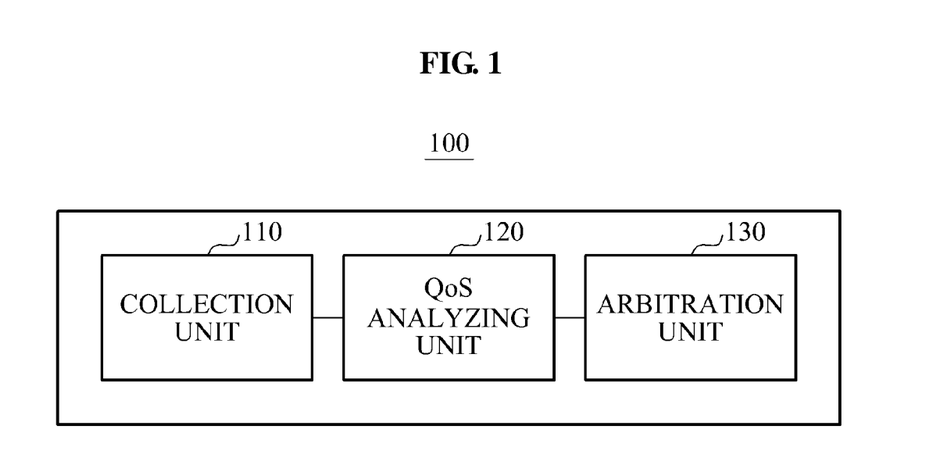
FIG. 1 illustrates a block diagram of a configuration of a bus arbitration apparatus according to example embodiments.

FIG. 1 illustrates a block diagram of a configuration of a bus arbitration apparatus according to example embodiments.

Referring to FIG. 1, a bus arbitration apparatus 100 for arbitrating a plurality of masters sending an arbitration request for a bus system may include, for example, a collection unit 110, a Quality of Service (QoS) analyzing unit 120, and an arbitration unit 130.

The collection unit 110 may collect the arbitration requests and accumulated arbitration information for each of the plurality of masters.

The accumulated arbitration information may include at least one of requested data amount information, transmitted data amount information, remaining data amount information, and current time information.

The QoS analyzing unit 120 may classify the plurality of masters into a plurality of master types based on a master characteristic of each of the plurality of masters.

The plurality of master types may include a single transmission real-time master, a multi-transmission real-time master, a single transmission non-real-time master, and a multi-transmission non-real-time master. Hereinafter, the plurality of master types will be further described with reference to FIG. 2.

Figure 2:
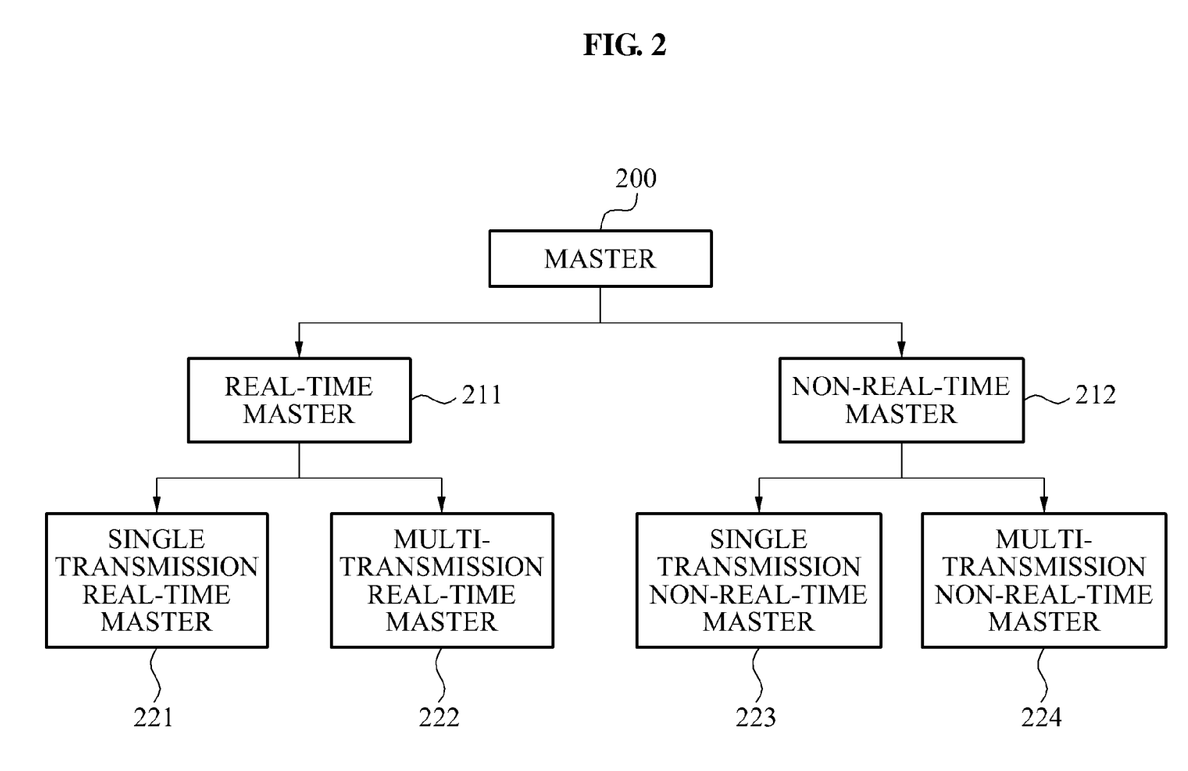
FIG. 2 illustrates a diagram of master types according to example embodiments.

FIG. 2 illustrates a diagram of master types according to example embodiments.

Referring to FIG. 2, a master 200 may be divided into a real-time master 211, and a non-real-time master 212.

The real-time master 211 may be a master for which performance is reduced to "0" when a bus insufficiently supports an amount of data required to be transmitted.

The non-real-time master 212 may be a master for which performance is reduced at a predetermined ratio when a data processing time takes longer than a time requirement.

The real-time master 211 may be divided into a single transmission real-time master 221, and a multi-transmission real-time master 222.

Additionally, the non-real-time master 212 may be divided into a single transmission non-real-time master 223, and a multi-transmission non-real-time master 224.

A single transmission master classified as the single transmission real-time master 221 or the single transmission non-real-time master 223 may be a master for processing data by transmitting the data once.

Accordingly, the single transmission real-time master 221 may process data by transmitting the data once, and may have the performance that is reduced to "0" when a bus insufficiently supports an amount of data required to be transmitted.

Additionally, the single transmission non-real-time master 223 may process data by transmitting the data once, and may have the performance that is reduced at a predetermined ratio when a data processing time takes longer than a time requirement.

A multi-transmission master classified as the multi-transmission real-time master 222 or the multi-transmission non-real-time master 224 may be a master for processing data by transmitting the data multiple times.

Accordingly, the multi-transmission real-time master 222 may process data by transmitting the data multiple times, and may have the performance that is reduced to "0" when a bus insufficiently supports an amount of data required to be transmitted.

Additionally, the multi-transmission non-real-time master 224 may process data by transmitting the data multiple times, and may have the performance that is reduced at a predetermined ratio when a data processing time takes longer than a time requirement.

Since the single transmission real-time master 221, the multi-transmission real-time master 222, the single transmission non-real-time master 223, and the multi-transmission non-real-time master 224 have different characteristics as described above, each performance may be changed in different forms when data processing is delayed. Hereinafter, a change in performance depending on a delay of data processing will be described in detail with reference to FIGS. 3 to 6.

Figure 3:
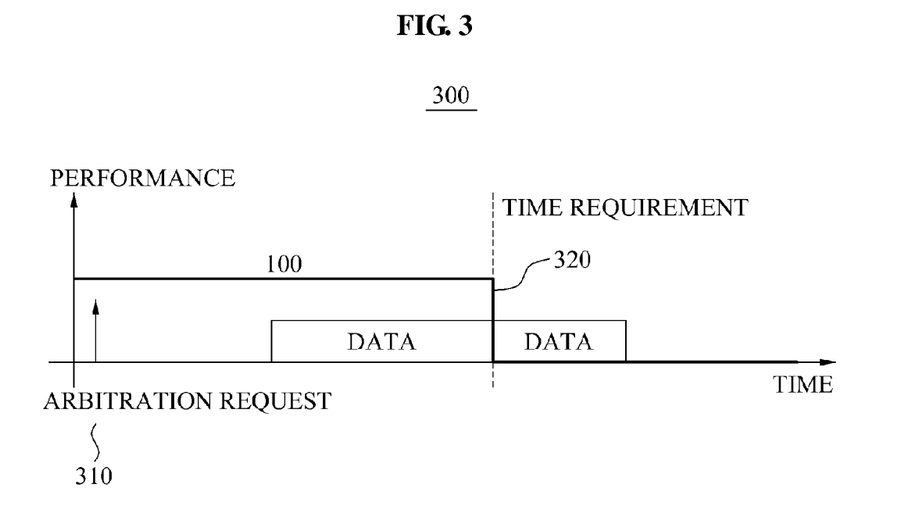
FIG. 3 illustrates a graph of a performance of a single transmission real-time master according to example embodiments.

FIG. 3 illustrates a graph of the performance of a single transmission real-time master according to example embodiments.

Referring to the graph 300 of FIG. 3, the single transmission real-time master may process data by transmitting the data once, in response to a single arbitration request 310. Additionally, when a bus insufficiently supports an amount of data required to be transmitted, the performance of the single transmission real-time master may be reduced to "0", as indicated by reference numeral 320.

The performance of the single transmission real-time master may be computed, as given in Equation 1.

$$\text{Single transmission real-time master} = \frac{(\text{Delay time} > 0)}{0:100} \quad \text{[Equation 1]}$$

Figure 4:
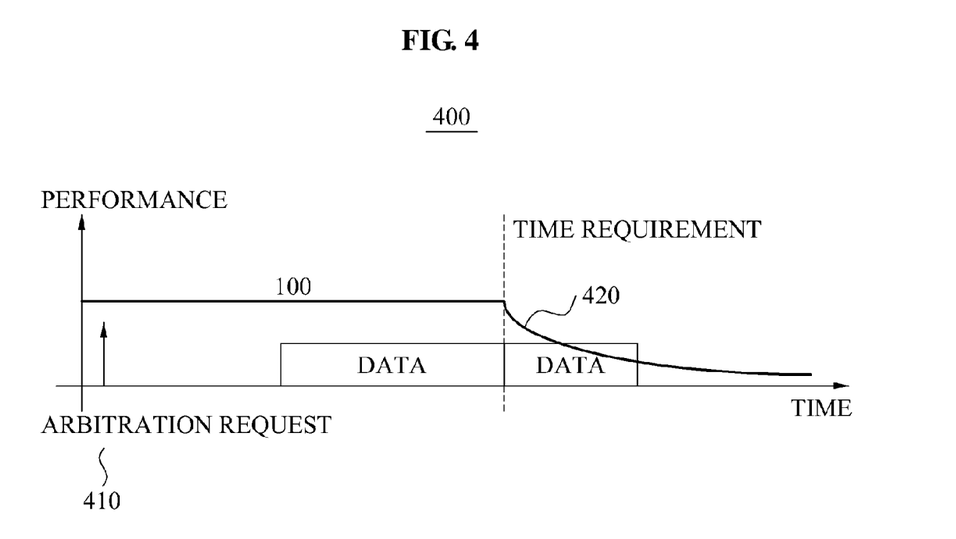
FIG. 4 illustrates a graph of a performance of a single transmission non-real-time master according to example embodiments.

FIG. 4 illustrates a graph of the performance of a single transmission non-real-time master according to example embodiments.

Referring to the graph 400 of FIG. 4, the single transmission non-real-time master may process data by transmitting the data once, in response to a single arbitration request 410. Additionally, when a data processing time takes longer than a time requirement, the performance of the single transmission non-real-time master may be reduced at a predetermined ratio, as indicated by reference numeral 420.

The performance of the single transmission non-real-time master may be computed, as given in Equation 2.

$$\text{Single transmission non-real-time master} = \text{Time requirement}/(\text{Time requirement} + \text{Delay time}) \times 100 \quad \text{[Equation 2]}$$

Figure 5:
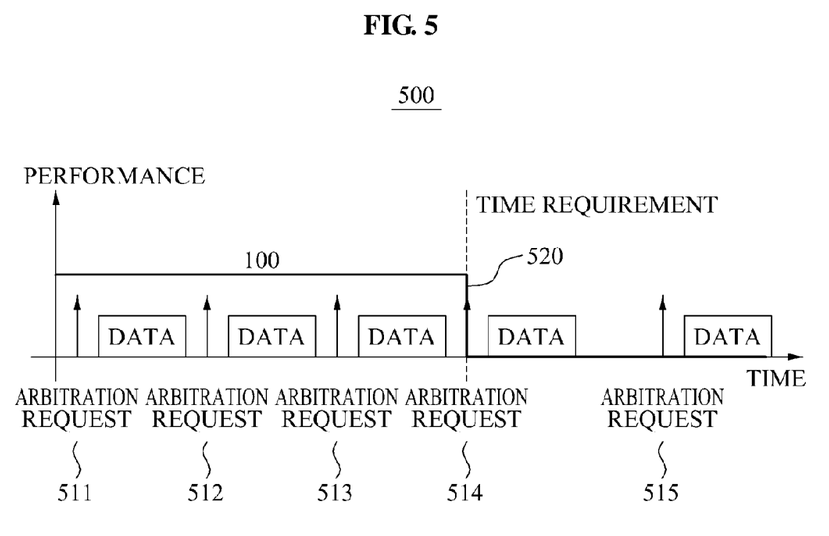
FIG. 5 illustrates a graph of a performance of a multi-transmission real-time master according to example embodiments.

FIG. 5 illustrates a graph of the performance of a multi-transmission real-time master according to example embodiments.

Referring to the graph 500 of FIG. 5, the multi-transmission real-time master may process data by transmitting the data multiple times, in response to a plurality of arbitration requests 511, 512, 513, 514, and 515. Additionally, when a bus insufficiently supports an amount of data required to be transmitted, the performance of the multi-transmission real-time master may be reduced to "0", as indicated by reference numeral 520.

The performance of the multi-transmission real-time master may be computed, as given in Equation 3.

$$\text{Multi-transmission real-time master} = \frac{(\text{Delay time} > 0)}{0:100} \quad \text{[Equation 3]}$$

Figure 6:
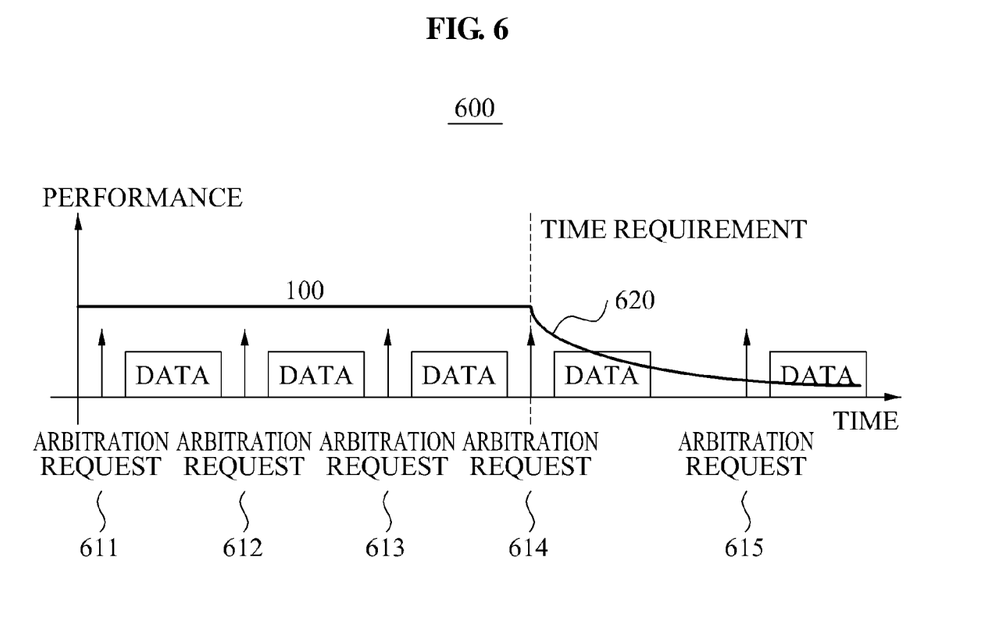
FIG. 6 illustrates a graph of a performance of a multi-transmission non-real-time master according to example embodiments.

FIG. 6 illustrates a graph of the performance of a multi-transmission non-real-time master according to example embodiments.

Referring to the graph 600 of FIG. 6, the multi-transmission non-real-time master may process data by transmitting the data multiple times, in response to a plurality of arbitration requests 611, 612, 613, 614, and 615. Additionally, when a data processing time takes longer than a time requirement, the performance of the multi-transmission non-real-time master may be reduced at a predetermined ratio, as indicated by reference numeral 620.

The performance of the multi-transmission non-real-time master may be computed, as given in Equation 4.

Multi-transmission non-real-time master=Time requirement/(Time requirement+Delay time)× 100     [Equation 4]

Referring back to FIG. 1, the QoS analyzing unit 120 may compute a delay time for each of the plurality of masters, based on the accumulated arbitration information, the arbitration requests, and the plurality of master types.

According to an aspect, the QoS analyzing unit 120 may compute a delay time of a single transmission master, based on at least one of delay time restriction condition information, data margin information, transmitted data amount information, requested data amount information, remaining data amount information, and current time information with respect to the single transmission master. Here, the single transmission master may be classified as the single transmission real-time master or the single transmission non-real-time master.

Additionally, the QoS analyzing unit 120 may compute a delay time of a multi-transmission master, based on at least one of data period information, information on an amount of data transmitted per period, data margin information, transmitted data amount information, remaining data amount information, and current time information with respect to the multi-transmission master. Here, the multi-transmission master may be classified as the multi-transmission real-time master or the multi-transmission non-real-time master.

Hereinafter, a method of computing a delay time will be further described with reference to FIGS. 7 and 8.

Figure 7:
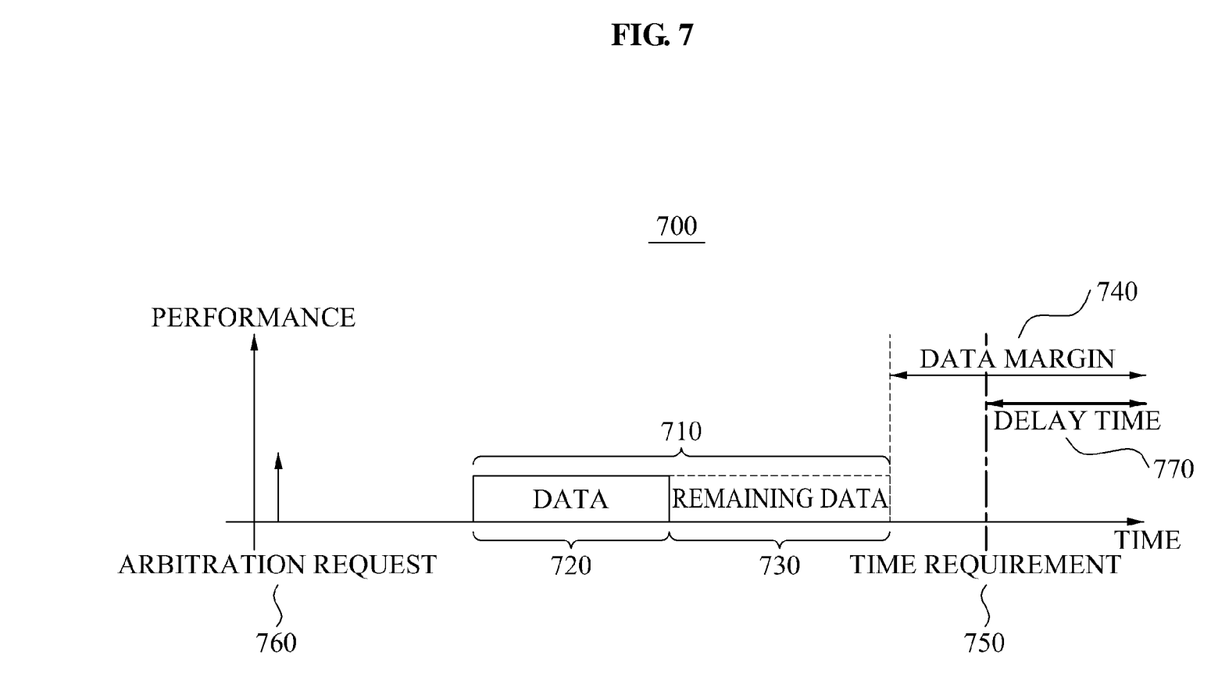
FIG. 7 illustrates a graph of a time table associated with data transmission of a single transmission master according to example embodiments.

FIG. 7 illustrates a graph 700 of a time table associated with data transmission of a single transmission master according to example embodiments.

A bus arbitration apparatus according to example embodiment may compute a delay time of the single transmission master, based on information set in advance in a bus system, and accumulated arbitration information regarding the single transmission master. Here, the single transmission master may be classified as the single transmission real-time master or the single transmission non-real-time master.

The information set in advance in the bus system may include information regarding a delay time restriction condition and a data margin 740.

Additionally, the accumulated arbitration information regarding the single transmission master may include information regarding a requested data amount 710, a transmitted data amount 720, a remaining data amount 730, and a current time.

According to an aspect, the bus arbitration apparatus may compute the delay time of the single transmission master, using Equation 5.

Delay time of single transmission master=(Current time+Remaining data amount+Data margin)− Time requirement     [Equation 5]

Here, the current time may indicate a cycle counted from a time point that an arbitration request 760 is received from the single transmission master.

The remaining data amount 730 may indicate a data amount obtained by subtracting the transmitted data amount 720 from the requested data amount 710.

The requested data amount 710 may indicate a number of pieces of data requested in response to the arbitration request 760 from the single transmission master.

The transmitted data amount 720 may indicate a number of pieces of data transmitted from the time point that the arbitration request 760 is received from the single transmission master up to the current time.

The data margin 740 may indicate a number of cycles sufficient to satisfy a time requirement 750 for the single transmission master.

The time requirement 750 may indicate a value obtained by adding the requested data amount 710 and the delay time restriction condition, and may be computed using Equation 6.

Time requirement=Requested data amount+Delay time restriction condition     [Equation 6]

Here, the delay time restriction condition may indicate a time obtained by excluding a data transmission cycle from an allowable delay time of the single transmission master.

Figure 8:
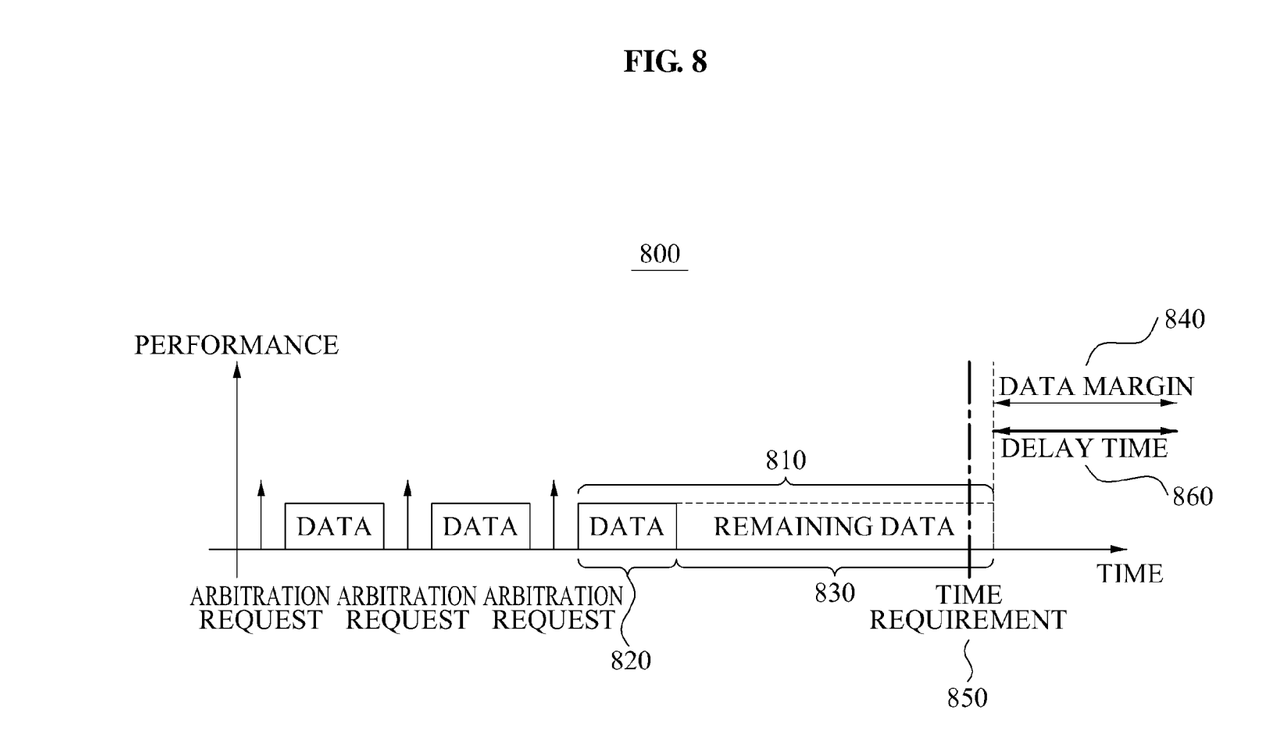
FIG. 8 illustrates a graph of a time table associated with data transmission of a multi-transmission master according to example embodiments.

FIG. 8 illustrates a graph of a time table associated with data transmission of a multi-transmission master according to example embodiments.

A bus arbitration apparatus according to example embodiment may compute a delay time of the multi-transmission master, based on information set in advance in a bus system, and accumulated arbitration information regarding the multi-transmission master. Here, the multi-transmission master may be classified as the multi-transmission real-time master or the multi-transmission non-real-time master.

The information set in advance in the bus system may include information regarding a data period, an amount 810 of data transmitted per period, and a data margin 840.

Additionally, the accumulated arbitration information regarding the multi-transmission master may include information regarding a requested data amount 810, a transmitted data amount 820, a remaining data amount 830, and a current time.

According to an aspect, the bus arbitration apparatus may compute the delay time of the multi-transmission master, using Equation 7.

Delay time of multi-transmission master=(Current time+Remaining data amount+Data margin)− Time requirement     [Equation 7]

Here, the current time may indicate a cycle counted from an initiation of a data period.

The data period may indicate a time interval for data transmission.

The remaining data amount 830 may indicate a data amount obtained by subtracting the transmitted data amount 820 from the amount 810 of data transmitted per period.

The amount 810 of data transmitted per period may indicate an amount of data that needs to be transmitted during a single data period.

The transmitted data amount 820 may indicate a number of pieces of data transmitted to a current cycle from the initiation of the data period.

The data margin 840 may indicate a number of cycles sufficient to satisfy a time requirement 850 for the multi-transmission master.

The time requirement 850 may indicate a data period, and may be computed using Equation 8:

Time requirement=Data period     [Equation 8]

Referring back to FIG. 1, the arbitration unit 130 may generate a bus arbitration signal based on the plurality of master types and the delay time. The bus arbitration signal may be used to arbitrate the plurality of masters.

According to an aspect, the arbitration unit 130 may group the plurality of masters into a plurality of groups based on the plurality of master types and the delay time.

The arbitration unit 130 may generate a group arbitration signal for each of the plurality of groups. The group arbitration signal may be used to arbitrate at least one master included in a single group. Depending on example embodiments, different bus arbitration methods may be set for each of the plurality of groups, and a group arbitration signal may be generated for each of the plurality of groups based on the set bus arbitration methods.

The arbitration unit 130 may generate a bus arbitration signal from the group arbitration signal, based on priority information of the plurality of groups.

According to an aspect, the arbitration unit 130 may group, in a first group, a master that has a delay time exceeding "0" and that is classified as a single transmission real-time master and a master that has a delay time exceeding "0" and that is classified as a multi-transmission real-time master among the plurality of masters.

Additionally, the arbitration unit 130 may group, in a second group, a master that has a delay time exceeding "0" and that is classified as a multi-transmission non-real-time master among the plurality of masters, and a master classified as a single transmission non-real-time master among the plurality of masters.

The arbitration unit 130 may also group, in a third group, a master that has a delay time of "0" and that is classified as a multi-transmission non-real-time master among the plurality of masters.

The arbitration unit 130 may also group, in a fourth group, a master that has a delay time of "0" and that is classified as a single transmission real-time master, and a master that has a delay time of "0" and that is classified as a multi-transmission real-time master among the plurality of masters.

Depending on example embodiments, the priority information may be set so that priority levels may be assigned to the first group to the fourth group in a descending order. In other words, the first group may have a highest priority level, and the fourth group may have a lowest priority level.

The arbitration unit 130 may generate four group arbitration signals for the first group to the fourth group.

Additionally, the arbitration unit 130 may generate a final bus arbitration signal from the four group arbitration signals, based on the priority information.

Figure 9:
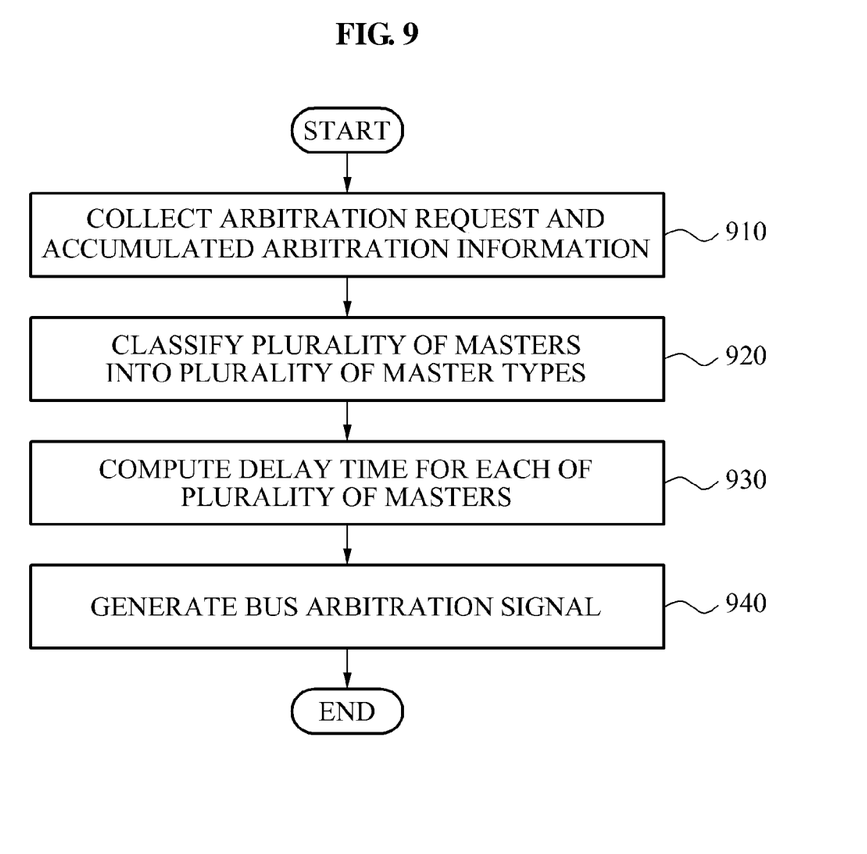
FIG. 9 illustrates a flowchart of a bus arbitration method according to example embodiments.

FIG. 9 illustrates a flowchart of a bus arbitration method according to example embodiments.

The bus arbitration method of FIG. 9 may be performed to arbitrate a plurality of masters sending an arbitration request to a bus system. In FIG. 9, in operation 910, accumulated arbitration information and an arbitration request for each of the plurality of masters may be collected.

The accumulated arbitration information may include at least one of requested data amount information, transmitted data amount information, remaining data amount information, and current time information.

In operation 920, the plurality of masters may be classified into a plurality of master types, based on a master characteristic of each of the plurality of masters.

The plurality of master types may include a single transmission real-time master, a multi-transmission real-time master, a single transmission non-real-time master, and a multi-transmission non-real-time master.

In operation 930, a delay time may be computed for each of the plurality of masters, based on the accumulated arbitration information, the arbitration request, and the plurality of master types.

According to an aspect, in the bus arbitration method, a delay time of a single transmission master may be computed, based on at least one of delay time restriction condition information, data margin information, transmitted data amount information, requested data amount information, remaining data amount information, and current time information with respect to the single transmission master. Here, the single transmission master may be classified as the single transmission real-time master or the single transmission non-real-time master.

Additionally, a delay time of a multi-transmission master may be computed, based on at least one of data period information, information on an amount of data transmitted per period, data margin information, transmitted data amount information, remaining data amount information, and current time information with respect to the multi-transmission master. Here, the multi-transmission master may be classified as the multi-transmission real-time master or the multi-transmission non-real-time master.

In operation 940, a bus arbitration signal may be generated based on the plurality of master types and the delay time. Here, the bus arbitration signal may be used to arbitrate the plurality of masters.

According to an aspect, in operation 940, the plurality of masters may be grouped into a plurality of groups based on the plurality of master types and the delay time.

Additionally, in operation 940, a group arbitration signal for each of the plurality of groups may be generated. The group arbitration signal may be used to arbitrate at least one master included in a single group. Depending on example embodiments, different bus arbitration methods may be set for each of the plurality of groups, and a group arbitration signal may be generated for each of the plurality of groups based on the set bus arbitration methods.

Furthermore, in operation 940, a bus arbitration signal may be generated from the group arbitration signal, based on priority information of the plurality of groups.

According to an aspect, a master that has a delay time exceeding "0" and that is classified as a single transmission real-time master or a multi-transmission real-time master among the plurality of masters may be grouped in a first group.

Additionally, a master that has a delay time exceeding "0" and that is classified as a multi-transmission non-real-time master among the plurality of masters, and a master classified as a single transmission non-real-time master among the plurality of masters may be grouped in a second group.

Furthermore, a master that has a delay time of "0" and that is classified as a multi-transmission non-real-time master among the plurality of masters may be grouped in a third group.

Moreover, a master that has a delay time of "0" and that is classified as a single transmission real-time master or a multi-transmission real-time master among the plurality of masters may be grouped in a fourth group.

Depending on example embodiments, the priority information may be set so that priority levels may be assigned to the first group to the fourth group in a descending order. In other words, the first group may have a highest priority level, and the fourth group may have a lowest priority level.

In the bus arbitration method, four group arbitration signals for the first group to the fourth group may be generated.

Additionally, a final bus arbitration signal may be generated from the four group arbitration signals, based on the priority information.

The above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like.

Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa. Any one or more of the software modules or units described herein may be executed by a dedicated processor unique to that unit or by a processor common to one or more of the modules. The described methods may be executed on a general purpose computer or processor or may be executed on a particular machine such as the bus arbitration apparatuses described herein.

Although example embodiments have been shown and described, it would be appreciated by those skilled in the art that changes may be made in these example embodiments without departing from the principles and spirit of the disclosure, the scope of which is defined in the claims and their equivalents.

What is claimed is:

1. A bus arbitration apparatus for arbitrating a plurality of masters sending an arbitration request for a bus system, the bus arbitration apparatus comprising:
    a processor to control one or more processor-executable units;
    a collection unit to collect the arbitration request and accumulated arbitration information for each of the plurality of masters;
    a Quality of Service (QoS) analyzing unit to classify the plurality of masters into a plurality of master types based on a master characteristic of each of the plurality of masters, and to compute a delay time for each of the plurality of masters based on the accumulated arbitration information, the arbitration request, and the plurality of master types; and
    an arbitration unit to generate a bus arbitration signal based on the plurality of master types and the delay time, the bus arbitration signal being used to arbitrate the plurality of masters,
    wherein the QoS analyzing unit classifies the plurality of masters into the plurality of master types using a number of transmission of data for processing the data and a change in performance depending on a delay of data processing,
    wherein the plurality of master types comprise a single transmission real-time master, a multi-transmission real-time master, a single transmission non-real-time master, and a multi-transmission non-real-time master, and
    wherein the plurality of groups comprise:
        a first group including a master with a delay time exceeding "0" among masters classified as the single transmission real-time master or the multi-transmission real-time master;
        a second group including a master with a delay time exceeding "0" among masters classified as the multi-transmission non-real-time master or the single transmission non-real-time master;
        a third group including a master with a delay time of "0" among masters classified as the multi-transmission non-real-time master; and
        a fourth group including a master with a delay time of "0" among masters classified as the single transmission real-time master or the multi-transmission real-time master.

2. The bus arbitration apparatus of claim 1, wherein the arbitration unit groups the plurality of masters into a plurality of groups based on the plurality of master types and the delay time generates a group arbitration signal for each of the plurality of groups, and generates the bus arbitration signal from the group arbitration signal based on priority information of the plurality of groups.

3. The bus arbitration apparatus of claim 1, wherein the plurality of master types comprise a single transmission real-time master, a multi-transmission real-time master, a single transmission non-real-time master, and a multi-transmission non-real-time master.

4. The bus arbitration apparatus of claim 3, wherein the QoS analyzing unit computes a delay time of a single transmission master, based on at least one of delay time restriction condition information, data margin information, transmitted data amount information, requested data amount information, remaining data amount information, and current time information with respect to the single transmission master, the single transmission master being classified as one of the single transmission real-time master or the single transmission non-real-time master.

5. The bus arbitration apparatus of claim 3, wherein the QoS analyzing unit computes a delay time of a multi-transmission master, based on at least one of data period information, information on an amount of data transmitted per period, data margin information, transmitted data amount information, remaining data amount information, and current time information with respect to the multi-transmission master, the multi-transmission master being classified as one of the multi-transmission real-time master or the multi-transmission non-real-time master.

6. A bus arbitration method for arbitrating a plurality of masters sending an arbitration request for a bus system, the bus arbitration method comprising:
    collecting the arbitration request and accumulated arbitration information for each of the plurality of masters;
    classifying the plurality of masters into a plurality of master types based on a master characteristic of each of the plurality of masters;
    computing, by way of a processor, a delay time for each of the plurality of masters based on the accumulated arbitration information, the arbitration request, and the plurality of master types; and
    generating a bus arbitration signal based on the plurality of master types and the delay time, the bus arbitration signal being used to arbitrate the plurality of masters,
    wherein the classifying classifies the plurality of masters into the plurality of master types using a number of transmission of data for processing the data and a change in performance depending on a delay of data processing, wherein the plurality of master types comprise a single transmission real-time master, a multi-transmission real-time master, a single transmission non-real-time master, and a multi-transmission non-real-time master, and wherein the plurality of groups comprise:

a first group including a master with a delay time exceeding "0" among masters classified as the single transmission real-time master or the multi-transmission real-time master;

a second group including a master with a delay time exceeding "0" among masters classified as the multi-transmission non-real-time master or the single transmission non-real-time master;

a third group including a master with a delay time of "0" among masters classified as the multi-transmission non-real-time master; and a fourth group including a master with a delay time of "0" among masters classified as the single transmission real-time master or the multi-transmission real-time master.

7. The bus arbitration method of claim 6, wherein the generating comprises:

grouping the plurality of masters into a plurality of groups based on the plurality of master types and the delay time;

generating a group arbitration signal for each of the plurality of groups; and generating the bus arbitration signal from the group arbitration signal based on priority information of the plurality of groups.

8. The bus arbitration method of claim 6, wherein the plurality of master types comprise a single transmission real-time master, a multi-transmission real-time master, a single transmission non-real-time master, and a multi-transmission non-real-time master.

9. The bus arbitration method of claim 8, wherein the computing comprises computing a delay time of a single transmission master, based on at least one of delay time restriction condition information, data margin information, transmitted data amount information, requested data amount information, remaining data amount information, and current time information with respect to the single transmission master, the single transmission master being classified as the single transmission real-time master or the single transmission non-real-time master.

10. The bus arbitration method of claim 8, wherein the computing comprises computing a delay time of a multi-transmission master, based on at least one of data period information, information on an amount of data transmitted per period, data margin information, transmitted data amount information, remaining data amount information, and current time information with respect to the multi-transmission master, the multi-transmission master being classified as the multi-transmission real-time master or the multi-transmission non-real-time master.

11. A non-transitory computer readable recording medium storing a program to cause a computer to implement the method of claim 6.

12. A bus arbitration apparatus for arbitrating a plurality of masters each sending an arbitration request for a bus system, the bus arbitration apparatus comprising:

a processor to control one or more processor-executable units;

a Quality of Service (QoS) analyzing unit to classify the plurality of masters into a plurality of master types based on a master characteristic of each of the plurality of masters and to compute a delay time for each of the plurality of masters based on arbitration information accumulated for each of the plurality of masters, the arbitration requests, and the plurality of master types; and an arbitration unit to generate a bus arbitration signal to arbitrate the plurality of masters based on the plurality of master types and the delay time, wherein the QoS analyzing unit classifies the plurality of masters into the plurality of master types using a number of transmission of data for processing the data and a change in performance depending on a delay of data processing, wherein the plurality of master types comprise a single transmission real-time master, a multi-transmission real-time master, a single transmission non-real-time master, and a multi-transmission non-real-time master, and wherein the plurality of groups comprise:

a first group including a master with a delay time exceeding "0" among masters classified as the single transmission real-time master or the multi-transmission real-time master;

a second group including a master with a delay time exceeding "0" among masters classified as the multi-transmission non-real-time master or the single transmission non-real-time master;

a third group including a master with a delay time of "0" among masters classified as the multi-transmission non-real-time master; and a fourth group including a master with a delay time of "0" among masters classified as the single transmission real-time master or the multi-transmission real-time master.

13. The bus arbitration apparatus of claim 12, further comprising a collection unit to collect the arbitration requests and the accumulated arbitration information for each of the plurality of masters.

14. A bus arbitration method for arbitrating a plurality of masters each sending an arbitration request for a bus system, the bus arbitration method comprising:

classifying the plurality of masters into a plurality of master types based on a master characteristic of each of the plurality of masters;

computing, by way of a processor, a delay time for each of the plurality of masters based on arbitration information accumulated for each of the plurality of masters, the arbitration requests, and the plurality of master types; and generating a bus arbitration signal to arbitrate the plurality of masters based on the plurality of master types and the delay time, wherein the classifying classifies the plurality of masters into the plurality of master types using a number of transmission of data for processing the data and a change in performance depending on a delay of data processing, wherein the plurality of master types comprise a single transmission real-time master, a multi-transmission real-time master, a single transmission non-real-time master, and a multi-transmission non-real-time master, and wherein the plurality of groups comprise:

a first group including a master with a delay time exceeding "0" among masters classified as the single transmission real-time master or the multi-transmission real-time master;

a second group including a master with a delay time exceeding "0" among masters classified as the multi-transmission non-real-time master or the single transmission non-real-time master;
a third group including a master with a delay time of "0" among masters classified as the multi-transmission non-real-time master; and
a fourth group including a master with a delay time of "0" among masters classified as the single transmission real-time master or the multi-transmission real-time master.

15. The bus arbitration method of claim 14, wherein in the generating of the bus arbitration signal, the plurality of masters is grouped into a plurality of groups based on the plurality of master types and the delay time, and a priority is assigned to each of the plurality of groups in a descending order.

16. A non-transitory computer readable recording medium storing a program to cause a computer to implement the method of claim 14.

* * * * *